United States Patent Office 3,430,703
Patented Mar. 4, 1969

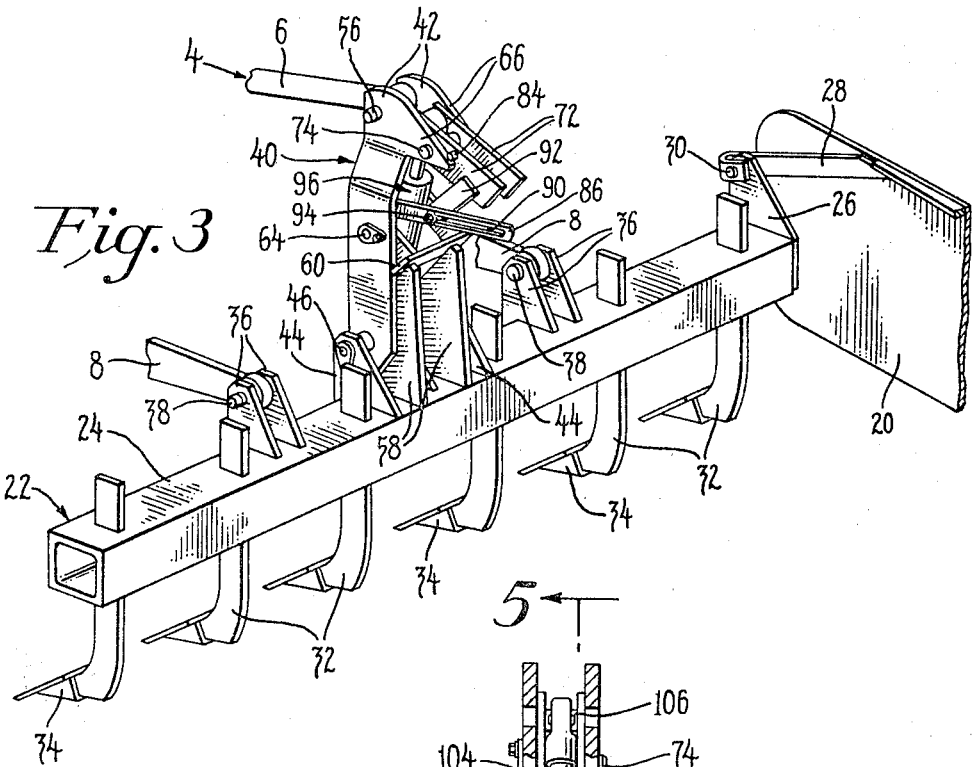

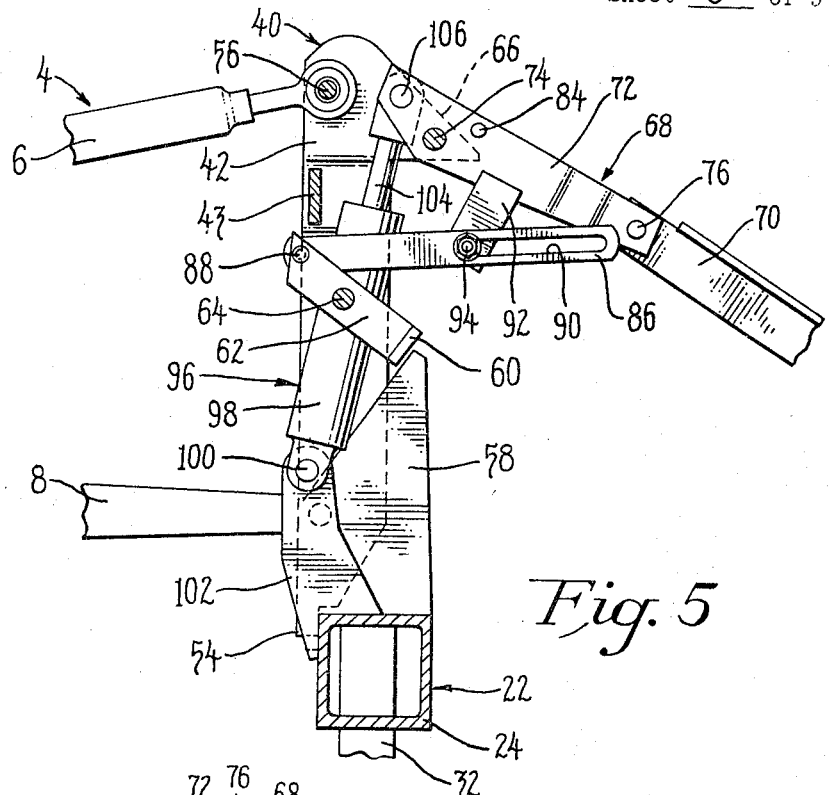

3,430,703
SCARIFYING AND SCRAPING IMPLEMENT
Clarence B. Richey, Fresno, Calif., assignor to
Massey-Ferguson Inc., Detroit, Mich.
Filed Mar. 20, 1967, Ser. No. 624,557
U.S. Cl. 172—136                                    10 Claims
Int. Cl. A01b 49/02; E02f 3/76

ABSTRACT OF THE DISCLOSURE

A scarifying and scraping implement in which the scarifying tool pivots relative to a scraper blade between earthworking and inoperative positions. In the earthworking position, the maximum working depth of the scarifying tool is determined by the height of the scraper blade, and a hydraulic ram is interconnected with the scarifying tool and scraper blade for both raising and lowering the scraper blade to vary the working depth of the scarifying tool, and for moving the scarifying tool between its earthworking and inoperative positions.

Summary of the invention

In landscaping operations, there is a need for an implement which can, when desired, scarify and scrape or smooth simultaneously with the working depth of the scarifier teeth adjustable relative to the blade. At present, this is accomplished either by having the scarifier teeth vertically controlled by a separate hydraulic ram, or by pivoting the scarifying tool to various positions relative to the scraper about a horizontal axis to vary the working depth. The latter arrangement has the disadvantages that the angle of attack of the teeth is different for each position, and the teeth do not always retract adequately for proper clearance when the scraper only is being employed.

In accordance with the present invention, the scraper blade is raised and lowered about the pivotal axis between the scraper bowl and scarifying tool to change the maximum working depth of the scarifying teeth. The scraper position is changed by means of a lever fulcrumed on a frame pivotally connected to the scarifying tool and connected through a brace or link with the scraper blade. Rotation of the lever about its fulcrum raises and lowers the scraper blade relative to the scarifying tool. Actuation of the lever is accomplished by a power member preferably in the form of a hydraulic cylinder which operates in one direction to sequentially move the scarifying tool to its earthworking position and then progressively raise the scraper blade to increase the maximum working depth of the scarifying teeth. Operation of the hydraulic cylinder in the opposite direction sequentially lowers the scraper blade to its lowest position, actuates a latch to release the scarifying tool, and then moves the scarifying tool from its earthworking position to its inoperative position.

Brief description of the drawings

FIG. 3 is a perspective view of a portion of the implement;

FIG. 4 is a view taken on line 4—4 of FIG. 1;

FIG. 5 is a sectional view taken on lines 5—5 of FIG. 4; and

FIG. 6 is a view similar to FIGS. 1 and 2 with the implement in still another position.

Figure 1:
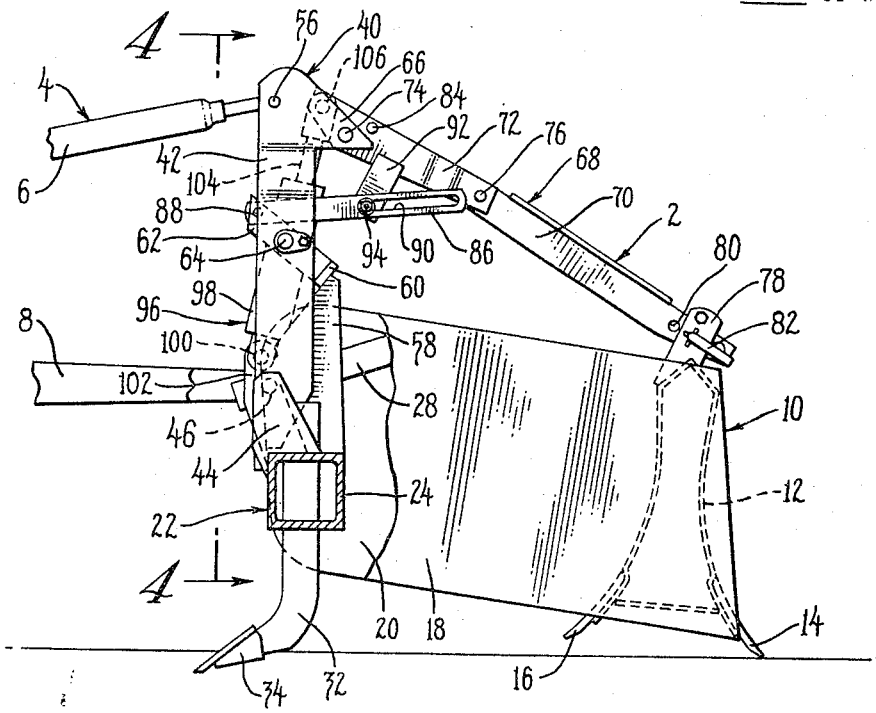
FIG. 1 is an elevational view, partially in section, of a scarifying and scraping implement embodying the invention.

In the drawings, the implement is collectively designated by reference numeral 2 and is supported on a tractor hitch designated generally by reference numeral 4. The illustrated hitch 4 is a conventional three-point hitch including a top link 6 and a pair of lower draft links 8. Implement 2 includes a scraper bowl 10 consisting of a double moldboard scraper 12 with rear and front scraper blades 14 and 16, respectively. Projecting forwardly from the ends of the moldboard 12 are side panels 18 and 20.

Supported between saide panels 18 and 20 is a scarifying tool designated collectively by reference numeral 22 and including a beam 24 having plates 26 at its ends which are pivotally supported by pins 30 on brackets 28 carried by the side panels near the forward ends thereof. A plurality of shanks 32 for scarifying teeth 34 are mounted along the length of beam 24. The scarifying tool is pivotable about the axis of pins 30 relative to the scraper between an operative, earthworking position as shown for example in FIGS. 1, 3 and 6, and an inoperative, out-of-use position as shown for example in FIG. 2. In the earthworking position, the maximum working depth of teeth 34 is determined by the vertical position of the scraper blades 14, 16 relative to the teeth.

Beam 24 is secured to the tractor hitch by means of lower link attachment lugs 36 on the upper surface of beam 24. Lugs 36 are pivotally connected by pins 38 with the lower darft links 8 of the tractor hitch. The top link 6 is secured to an upright frame 40 made up of a pair of symmetrical plates 42 secured together by a strap member 43 (FIG. 4) and pivotally connected at its lower end by pins 46 to lugs 44 projecting upwardly from beam 24. Pins 46 are received in apertures in lugs 44, a sleeve 48 mounted in an aperture in each plate 42 and in plates 58. Caps 50 on the outer ends of pins 46 are secured by screws 52 to the lugs to prevent the pins from being displaced axially. Lower extensions 54 are formed on the frame sections 42 to provide stops for abutting engagement with the beam 24 in its operative position as shown in FIGS. 1 and 6. Top link 6 is pivotally secured between the upper ends of plates 42 by a pin 56.

Figure 2:
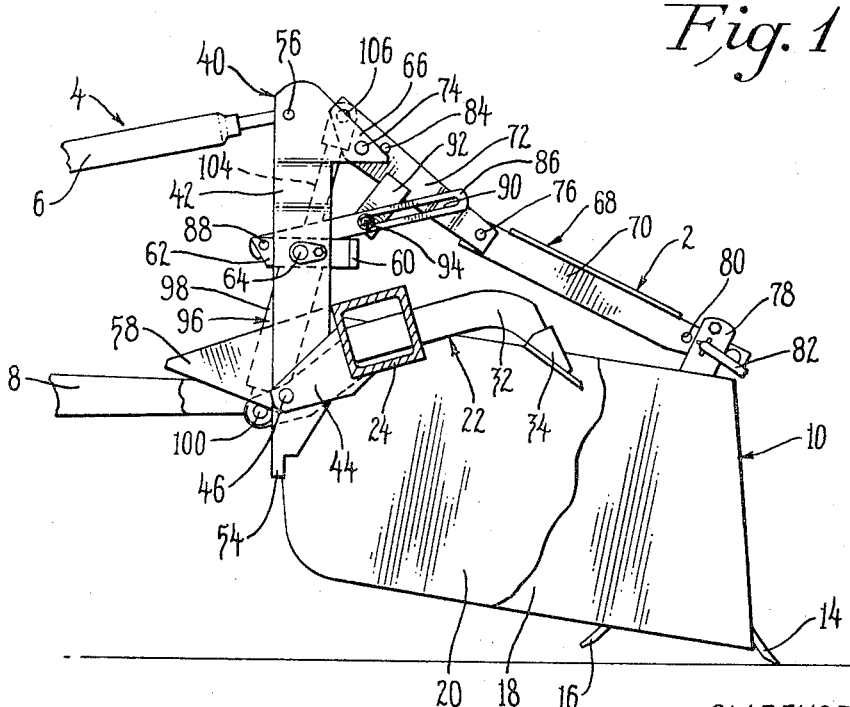
FIG. 2 is a view similar to FIG. 1 with the implement shown in an alternate position.

Mounted on beam 24 by welding or other conventional means and projecting between plates 42 of frame 40 is a pair of locking plates 58 which, in the operative, earthworking position of the scarifying tool are engaged by a latch 60 to restrain the scarifying tool against movement from its earthworking position. Latch 60 is mounted on latch arms 62 pivotally supported at 64 on plate members 42. In order to pivot the scarifying tool from the operative position shown in FIG. 1 to the inoperative position of FIG. 2, latch 60 must be pivoted in a counter-clockwise direction about the axes of pins 64 from its locking position (FIG. 1) to its unlocked position (FIG. 2).

With reference primarily to FIGS. 5 and 6, plates 42 of frame 40 are each formed with rearward extensions 66 at their upper ends, and a linkage assembly 68 extends between extensions 66 and the scraper. Linkage assembly 68 includes a brace link 70 and a lever 72 having their ends pivotally connected by a pin 76. Lever 72 is fulcrumed on a pin 74 mounted between the extensions 66. The opposite end of link 70 from lever 72 is pivotally mounted in a bracket 78 by a latch pin 82 which projects through aligned apertures in bracket 78 and one of a series of holes 80 in the end of link 70. The connection between link 70 and the scraper moldboard 12 is similar to that shown in the United States patent application of Clarence B. Richey, Ser. No. 427,018, filed Jan. 21, 1965, now Patent No. 3,311,175, the entire disclosure of which is incorporated herein by reference. When lever 72 is rotated about fulcrum pin 74 in a counter-clockwise direction, link 70 lifts the scraper blades 14 and 16 relative to the scarifier as shown in FIG. 6. Conversely, clockwise rotation of lever 72 from the position shown in FIG. 6 lowers the scraper blades relative to the scarifier. Rotation of lever 72 in a clockwise direction is limited by the engagement of a stop pin 84 (projecting from the sides of the lever members 72) with the upper edge of extensions 66 on plates 42.

One end of a latch release link 86 is pivotally connected at 88 to the end of one of the latch arms 62. The other end of the latch release link 86 is formed with a slot 90. Slideably engaged in slot 90 is a pin 94 which in turn is carried by a strap 92 depending from lever 72. The relationship of strap 92, slot 90 and pin 94 with the fulcrum 74 of lever 72 is such that clockwise movement of lever 72 from the position shown in FIG. 5 causes counter-clockwise movement of latch arms 62 about pins 64 due to the engagement of pin 94 with the forward or left end of slot 90 in FIG. 5. The counter-clockwise rotation of arms 62 moves latch 60 out of the path of locking plates 58 (FIG. 2). Conversely, the initial counter-clockwise movement of lever 72 about its fulcrum pin 74 from the position of FIG. 2 causes latch arms 62 to swing in a clockwise direction about pins 64 to move latch 60 into locking engagement with plates 58. Continued counter-clockwise rotation of lever 72 causes pin 94 to slide toward the right end of slot 90 as shown in FIG. 6, pivoting lever 86 about pin 88 without affecting the position of latch 60.

Operation of scarifying tool 22 between its earthworking and inoperative positions, as well as actuation of lever 72 is accomplished by means of a two-way power member preferably in the form of a hydraulic ram 96. As will be described in detail below, ram 96 is interconnected with the scarifying tool and the scraper blades through an arm 102, frame 40, lever 72 and link 70 such that operation of the ram in one direction sequentially moves the scarifying tool 22 to its earthworking position and thereafter progressively raises the scraper blades relative to the teeth 34. Operation of ram 96 in the opposite direction sequentially lowers the blades and raises the scarifying tool from its earthworking position.

Arm 102 is welded onto beam 24 and projects upwardly and slightly forwardly thereof as illustrated in FIG. 1 to provide an actuating arm for rotating the scarifying tool 22 about pins 30. Ram 96 has a cylinder 98 pivotally connected at 100 with arm 102, and the piston 104 of ram 96 is pivotally connected at 106 with lever 72. Contraction of piston 104 into cylinder 98 tends to cause counter-clockwise rotation of lever 72 in FIG. 5, and extension of piston 104 from cylinder 98 tends to cause clockwise rotation of lever 72 about pin 74. Ram 96 may be connected through hydraulic hoses (not shown) with the tractor hydraulic system in a well known manner.

The operation will be described with sequential reference to FIGS. 2, 1 and 6. In FIG. 2, ram 96 is fully extended and stop pin 84 is engaged with the upper edge of extension 66, and the scarifying tool 22 is in its inoperative position with the scarifying teeth 34 positioned well above the lower edge of the scraper blades 14 and 16. To convert the implement for scarifying operations from the condition shown in FIG. 2, the tractor hitch is raised until the entire implement is out of engagement with the ground. Piston 104 of the ram 96 is then retracted partially into cylinder 98. The initial retraction of the ram causes the scarifying tool to pivot downwardly in a clockwise direction until beam 24 abuts against the lower extensions 54 on frame 40 due to the effect of the weight of the scarifying tool. After beam 24 engages stops 54, continued retraction of the ram causes lever 72 to swing in a counter-clockwise direction about pin 74, which movement causes pin 94 to pull upwardly on the latch release link 86 and rotate arms 62 clockwise to move the latch 60 into the path of plates 58 to hold the scarifying tool down. As the ram continues to contract, lever 72 continues to rotate in a counter-clockwise direction about pin 74 moving the scraper blades 14 and 16 upwardly relative to the scarifying tool about pins 30, thereby progressively increasing the maximum working depth of the scarifying teeth 34 due to the increased vertical clearance between the teeth 34 and the scraper blades. FIG. 6 shows the ram fully retracted to raise the blades to their maximum height with respect to the scarifying teeth.

Operation of the ram in the opposite direction causes clockwise movement of lever 72 from the position shown in FIG. 6 to lower the scraper blades relative to the scarifying teeth 34 and progressively decrease the vertical clearance between the scarifying teeth and scraper blades and hence decrease the maximum working depth of the scarifying teeth. When lever 72 returns to the approximate position shown in FIG. 1, further movement in a clockwise direction of lever 72 sequentially moves latch 60 out of the path of locking plates 58, and stop pin 84 into engagement with extensions 66. Further extension of the ram causes the scarifying tool to pivot in a counter-clockwise direction from its working to inoperative position due to the engagement of pin 84 with the extension 66 of frame 40. Since piston 104 is stopped by pin 84, additional fluid into ram 96 in the direction to extend the ram causes the cylinder 98 to move downwardly and pivot the scarifying tool to the idle position.

It will be apparent to those skilled in the art that the invention is not limited to the exact construction shown, but that various alterations in the construction and arrangement of parts can be made without departing from the scope and spirit of the invention.

I claim:
1. A scarifying and scraping implement comprising a scraper having a transverse blade with side panels projecting forwardly from the ends thereof, a transverse scarifying tool supported forwardly of the blade for movement relative to the scraper between an operative position in which the teeth of the scarifying tool project downwardly below the lower edge of the scraper blade to penetrate the ground to a maximum working depth determined by the vertical position of the blade relative to the teeth and an inoperative position in which the teeth of the scarifying tool are held above the lower edge of the scraper blade, a two-way power member, and means interconnecting said power member with said scarifying tool and blade such that said power member is operable in one way to sequentially move the scarifying tool to its earthworking position and thereafter progressively raise the blade to progressively increase the maximum working depth of the scarifying tool, and operable in the other way to sequentially move the blade to its lowest position relative to the scarifying tool and thereafter move the scarifying tool to its inoperative position.

2. A scarifying and scraping implement as claimed in claim 1 wherein said interconnecting means includes a frame pivotally connected with the scarifying tool, a lever fulcrumed on the frame, a link connected between the lever and blade such that rotation of the lever in one direction raises the blade relative to the scarifying tool and rotation of the lever in the opposite direction lowers the blade relative to the scarifying tool and said power member is connected between said lever and scarifying tool.

3. A scarifying and scraping implement as claimed in claim 2 further including a latch mounted on said frame for movement between a locking position engaged with the scarifying tool in its earthworking position to restrain the scarifying tool against movement from its earth-working position and a released position disengaged from the scarifying tool, and means connecting said lever with said latch for moving the latch to its locking position as the scarifying tool assumes its earthworking position and for moving the latch to its released position upon subsequent actuation of the power member in said other way.

4. A scarifying and scraping implement comprising a scraper having a transverse blade with side panels projecting forwardly from the ends thereof, a toothed scarifying tool supported forwardly of the blade for movement between an operative position in which the teeth of the scarifying tool project downwardly below the lower edge of the scraper blade to engage the ground and an inoperative position in which the teeth of the scarifying tool are held above the lower edge of the scraper blade, support means pivotally connected with the scarifying tool, a lever fulcrumed on the support means, means connecting the lever with the blade of the scraper such that actuation of the lever raises and lowers the blade relative to the support means and scarifier, and extensible and contractable power means interconnected with said lever and scarifying tool operable for selectively moving the scarifying tool between its operative and inoperative positions and for selectively actuating said lever to vary the maximum working depth of the scarifying tool in its operative position.

5. A scarifying and scraping implement as claimed in claim 4 wherein said power means comprises a hydraulic ram connected between said lever and scarifying tool such that retraction of the ram from its fully extended position sequentially moves the scarifying tool from its inoperative to earthworking position and thereafter progressively raises the blade to increase the maximum working depth of the scarifying tool, and extension of the ram from its fully retracted position sequentially lowers the blade and moves the scarifying tool from its earthworking to inoperative position.

6. A scarifying and scraping implement as claimed in claim 4 wherein said lever is rotatable in one direction to raise the blade and in the opposite direction to lower the blade, and further including stop means on said lever engageable with said support means to limit rotation of the lever in said opposite direction such that operation of the power means in the direction to rotate the lever in said opposite direction sequentially lowers the blade and thereafter moves the scarifying tool to its inoperative position, and operation of the power means to rotate said lever in said one direction sequentially moves the scarifying tool to its earthworking position and thereafter raises the blade.

7. A scarifying and scraping implement as claimed in claim 4 wherein the scarifying tool is pivotally mounted between the side panels of the scraper and is biased by its weight to rotate about its pivotal connection with the side panels to its earthworking position, and wherein said power means comprises a hydraulic ram having one end connected with said lever and its other end connected with said scarifying tool at a point spaced from said pivotal connection such that extension of the ram tends to rotate the scarifying tool to its inoperative position and retraction of the ram tends to permit the scarifying tool to rotate to its earthworking position.

8. A scarifying and scraping implement as claimed in claim 7 wherein retraction of said ram tends to cause rotation of said lever in one direction to raise the blade and extension of said ram tends to rotate said lever in the opposite direction to lower the blade, and further including stop means on said lever engageable with the support means to limit rotation of said lever in said opposite direction such that extension of the ram from its fully retracted position sequentially rotates said lever in said opposite direction until the stop means engages said support means and thereafter rotates the scarifying tool to its inoperative position, and retraction of the ram from its fully extended position sequentially causes the scarifying tool to rotate to its earthworking position and thereafter rotate said lever in said one direction.

9. A scarifying and scraping implement as claimed in claim 8 further including at least one extension on the support means engageable by the scarifying tool in its earthworking position to prevent movement of the scarifying tool from the earthworking position upon further retraction of the ram.

10. A scarifying and scraping implement as claimed in claim 9 further including a locking plate on the scarifying tool, a latch member pivotally mounted on the support means, and latch actuating means interconnected with said lever and said latch operable to actuate the latch into engagement with the locking plate as the scarifying tool is rotated to its earthworking position to lock the scarifying tool in its earthworking position against soil forces, and to actuate the latch member to disengage from the locking plate upon engagement of the stop means on said lever with said support means.

References Cited

UNITED STATES PATENTS

| | | | |
|---|---|---|---|
| 2,839,851 | 6/1958 | Geiszler | 172—197 |
| 3,034,238 | 5/1962 | McGee | 172—136 XR |
| 3,058,234 | 10/1962 | McGee | 172—197 |
| 3,069,791 | 12/1962 | French | 172—197 |
| 3,213,554 | 10/1965 | Dalton | 172—136 XR |
| 3,274,713 | 9/1966 | Jones | 172—197 |
| 3,311,175 | 3/1967 | Richey | 172—136 |

EDGAR S. BURR, *Primary Examiner.*

U.S. Cl. X.R.

37—117.5; 172—197, 777